United States Patent
Alpaslan et al.

(10) Patent No.: US 7,787,009 B2
(45) Date of Patent: Aug. 31, 2010

(54) THREE DIMENSIONAL INTERACTION WITH AUTOSTEREOSCOPIC DISPLAYS

(75) Inventors: Zahir Y. Alpaslan, Los Angeles, CA (US); Alexander A. Sawchuk, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 1341 days.

(21) Appl. No.: 11/124,865

(22) Filed: May 9, 2005

(65) Prior Publication Data

US 2006/0012675 A1 Jan. 19, 2006

Related U.S. Application Data

(60) Provisional application No. 60/569,670, filed on May 10, 2004, provisional application No. 60/614,306, filed on Sep. 28, 2004.

(51) Int. Cl.
H04N 13/04 (2006.01)
G06K 9/00 (2006.01)

(52) U.S. Cl. ......................... 348/51; 382/154

(58) Field of Classification Search .............. 348/51, 348/56, 57, 46, 54, 43, 700, 47, 42, 14.07, 348/14.09, 14.08, 14.12, 14.13, 14.14, 14.15, 348/14.16, 783, 782, 784, 785, 786, 787, 348/788, 14.01, 14.02; 382/304, 278, 106, 382/107, 154, 303

See application file for complete search history.

(56) References Cited

U.S. PATENT DOCUMENTS 5,714,997 A * 2/1998 Anderson ............... 348/39
6,241,609 B1 * 6/2001 Rutgers ................. 463/31
6,256,046 B1 * 7/2001 Waters et al. ............ 345/473
6,456,737 B1 * 9/2002 Woodfill et al. .......... 382/154
6,630,915 B1 * 10/2003 Flood ..................... 345/8
7,075,661 B2 * 7/2006 Petty et al. .............. 356/603
7,136,090 B1 * 11/2006 McDuffie White ....... 348/14.16
2002/0041327 A1 * 4/2002 Hildreth et al. .......... 348/42
2005/0083314 A1 * 4/2005 Shalit et al. ............. 345/179
2006/0013473 A1 * 1/2006 Woodfill et al. .......... 382/154

(Continued)

OTHER PUBLICATIONS

Dynamic Digital Depth, Bringing 3D to Mainstream, website dated 2005, obtained Apr. 26, 2006, http://www.ddd.com/.

(Continued)

*Primary Examiner*—Behrooz Senfi
(74) *Attorney, Agent, or Firm*—McDermott Will & Emery LLP

(57) ABSTRACT

An apparatus and method for 3D interaction with an autostereoscopic display are presented. A motion tracking system may include video cameras that track a 3D motion of a user within an interaction volume defined by the fields-of-view of the video cameras, as the user moves a light source or other optical marker or an anatomical region of the user within the interaction volume. The motion tracking system may generate 3D tracking data containing position information about the 3D motion. An imaging system may create a virtual scene by tracing 3D virtual objects in virtual space, using the position information in the 3D tracking data. The imaging system may synthesize a plurality of views of the virtual scene, and interlace the plurality of views to generate an interlaced image to drive the autostereoscopic display and to be displayed thereon.

13 Claims, 6 Drawing Sheets

U.S. PATENT DOCUMENTS

2007/0160222 A1* 7/2007 Trepte .................. 381/61
2008/0129819 A1* 6/2008 Mark et al. ............. 348/51

OTHER PUBLICATIONS

InterSense. Information available at http://www.intersense.com/, last updated Aug. 2004, copy obtained Apr. 26, 2006.

Heinrich-Hertz-Institute, mUltimo3D group website http://imwww.hhi.de/ English/im/projects/ old_projects/multimo3D/multimo3d.html, website dated 2004, copy obtained Apr. 26, 2006.

StereoGraphics, "The Syntha Gram Handbook," StereoGraphics Corporation, 2003, 11 pages.

Andiel, M. et al. Eye-Tracking for Autostereoscopic Displays using Web Cams. Stereoscopic Displays and Virtual Reality Systems IX, Proceedings of SPIE, vol. 4660 (2002), 8 pages.

Kakeya, H. et al. Autostereoscopic Display with Real-Image Virtual Screen and Light Filters. In Stereoscopic Displays and Virtual Reality Systems IX, Proceedings of SPIE, vol. 4660 (2002), pp. 349-357.

Kakeya, H. Autostereoscopic 3D Workbench Project. http://vmlab.kz.tsukuba.ac.jp/3d/Autostereoscopic%203D%20Workbench%20Project.htm. No date. (Retrieved Apr. 26, 2006.).

Lipton, L. et al. A New Autostereoscopic Display Technology The SynthaGram™. Stereoscopic Displays and Virtual Reality Systems IX, Proceedings of SPIE, vol. 4660 (2002), pp. 229-235.

Van Berkel, C. Touchless Display Interaction, in SID 02 Digest of Technical Papers, May 2002, vol. 33, No. 1, pp. 1410-1413.

Freeman, J. et al. Here, There and Everywhere: The Effects of Multichannel Audio on Presence. Proceedings of the 2001 International Conference on Auditory Display, Espoo, Finland, Jul. 29-Aug. 1, 2001. 4 pages.

Rupkalvis, J.A. Human Considerations in Stereoscopic Displays. Stereoscopic Displays and Virtual Reality Systems VIII. Proceedings of SPIE vol. 4297 (2001), pp. 268-275.

Yoshida, S. et al. A Technique for Precise Depth Representation in Stereoscopic Display. The Visual Computer, vol. 17, No. 1, 2001. 9 pages.

Ikits, M. et al. The Visual Haptic Workbench. In Proceedings of the Fifth PHANToM Users Group Workshop (PUG), 2000, 18 pages.

Liu, J. et al. Three-Dimensional PC: Toward Novel Forms of Human-Computer Interaction. In Three-Dimensional Video and Display: Devices and Systems SPIE CR76, Nov. 5-8, 2000, pp. 250-281.

Van Berkel, C. Image Preparation for 3D-LCD. In Stereoscopic Displays and Virtual Reality Systems VI, Proceedings of SPIE vol. 3639 (1999), pages 84-91.

Neveu, C.F. et al. The Virtual Lens. Presence, vol. 7, No. 4, Aug. 1998: 370-381.

Woods, A. et al. Image Distortions in Stereoscopic Video Systems. Stereoscopic Displays and Applications IV, Proceedings of the SPIE, vol. 1915 (1993), 13 pages.

Dewitt, T. Visual Music Searching for an Aesthetic, in Leonardo, vol. 20, No. 2, pp. 15-122, 1987.

Smith, C.W. 3-D or Not 3-D? New Scientist, vol. 102, No. 1407, pp. 40-44, April 26, 1984.

* cited by examiner

THREE DIMENSIONAL INTERACTION WITH AUTOSTEREOSCOPIC DISPLAYS

CROSS-REFERENCE TO RELATED APPLICATIONS

This application claims the benefit of priority under 35 U.S.C. §119(e) from U.S. Provisional Application Ser. No. 60/569,670, entitled "Three-Dimensional Interaction With Autostereoscopic Displays" and filed on May 10, 2004, by inventors Zahir Y. Alpaslan and Alexander A. Sawchuk. This application also claims the benefit of priority under 35 U.S.C. §119(e) from U.S. Provisional Application Ser. No. 60/614,306, entitled "Multiple Camera Image Acquisition Models For Multi-View 3D Display Interaction" and filed on Sep. 28, 2004, by inventors Zahir Y. Alpaslan and Alexander A. Sawchuk. Provisional application Ser. No. 60/569,670 and provisional application Ser. No. 60/614,306 are both incorporated herein by reference in their entireties.

GOVERNMENT INTEREST IN APPLICATION

This invention was made with government support under Contract Nos. EEC-9529152, EIA-0116573 and EIA-0321377 awarded by the National Science Foundation. The government has certain rights in the invention.

BACKGROUND

Stereoscopic systems may have gained popularity due to, inter alia, increases in the processing power of computers and the reduced price of high quality displays. Stereoscopic systems may present a viewer with an image of one or more three-dimensional (3D) objects such that the objects realistically appear to have a 3D depth. Most stereoscopic techniques may involve presenting a different view of the 3D object independently to each eye, and stereoscopic systems may employ apparatuses that keeps left and right eye images directed solely at the appropriate eye.

Autostereoscopic (AS) displays may make the stereo experience more attractive, by producing a 3D visual sensation without the use of glasses, goggles, helmets, head tracking, or other encumbering viewing aids. With the emergence of autostereoscopic displays, it may be possible to view images, movies and other kinds of data in 3D space without wearing glasses or other viewing equipment. Autostereoscopic displays that have been developed may include, by way of example, lenticular based autostereoscopic displays and barrier screen based systems.

Recently, researchers have been investigating stereoscopic viewing technology, for better 3D data visualization and manipulation. Efforts have been made, for example, to allow users to interact with an autostereoscopic displays, and to combine haptics with stereoscopic viewing technology.

SUMMARY

An apparatus may include an autostereoscopic display, a motion tracking system, and an imaging system. The motion tracking system may be configured to track a 3D motion of a user within an interaction volume as the user interacts with the autostereoscopic display, and to generate 3D tracking data containing position information about the 3D motion. The imaging system may be configured to process the 3D tracking data to generate therefrom an image for display on the autostereoscopic display.

An apparatus may include an autostereoscopic display, and means for tracking a 3D motion of a user within an interaction volume as the user interacts with the autostereoscopic display, and for generating 3D tracking data containing position information about the 3D motion. The apparatus may further include means for processing the 3D tracking data to generate therefrom an image for display on the autostereoscopic display.

A method of interacting with an autostereoscopic display may include tracking a 3D motion of a user within an interaction volume as the user interacts with the autostereoscopic display, and generating 3D tracking data containing position information about the 3D motion. The method may further include processing the 3D tracking data to generate therefrom an image for display on the autostereoscopic display.

A plurality of apparatuses may be connected through a network. Each apparatus may include an autostereoscopic display, a motion tracking system, and an imaging system. The motion tracking system may be configured to track a 3D motion of a user within an interaction volume as the user interacts with the autostereoscopic display, and to generate 3D tracking data containing position information about the 3D motion. The imaging system may be configured to process the 3D tracking data to generate therefrom an image for display on the autostereoscopic display.

DETAILED DESCRIPTION

An apparatus and method are described that allow one or more users to interact with an autostereoscopic display. A motion tracking system may track the 3D motion of one or more users within an interaction volume, as the users interact with the autostereoscopic display. 3D tracking data may be processed to create or manipulate objects in virtual space. A plurality of images, as seen by virtual cameras that observe the objects, may be synthesized, and the images may be interlaced to generate an interlaced image that drives the autostereoscopic display. In this way, the users may manipulate the position and orientation of displayed objects, and may outline, draw, or otherwise interact with the objects.

Figure 1A:
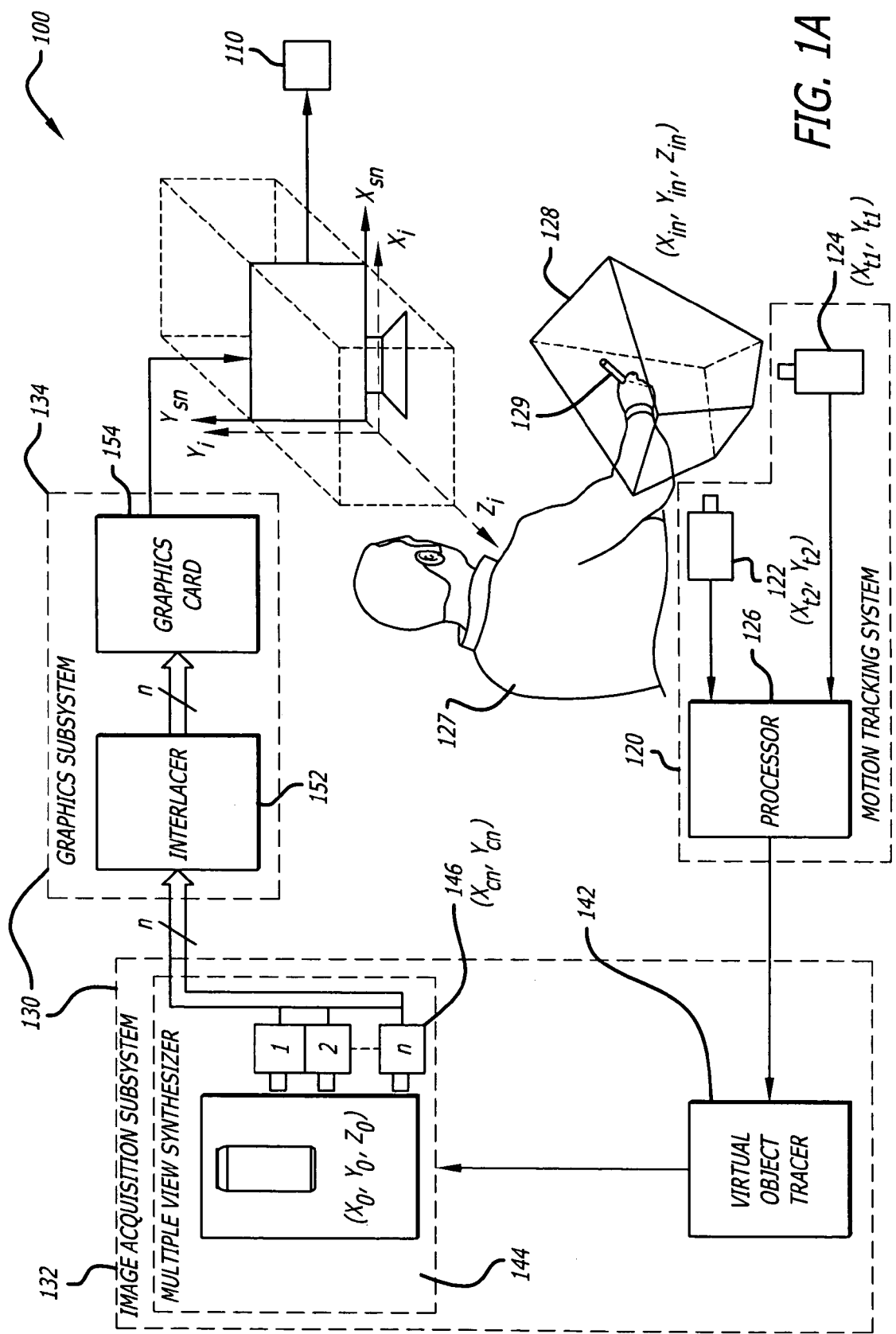
FIG. 1A illustrates a schematic block diagram of an apparatus that allows 3D interaction with autostereoscopic displays.

FIG. 1A illustrates a schematic block diagram of one embodiment of an apparatus 100 for 3D (three-dimensional) interaction with an autostereoscopic display. In overview, the apparatus 100 may include an autostereoscopic display 110; a motion tracking system 120; and an imaging system 130. The motion tracking system 120 may be configured to track a 3D motion of a user 127 within an interaction volume 128 as the user interacts with the autostereoscopic display 110, and to generate 3D tracking data that contain position information about the 3D interactive motion of the user 127. The imaging system 130 may be configured to process the 3D tracking data generated by the motion tracking system 120 so as to generate an image representing the interaction between the user and the autostereoscopic display 110. The imaging system 130 may send the image to drive the autostereoscopic display 110 and to be displayed thereon, thus forming a closed loop.

The autostereoscopic display 110 may be a multi-user display that allows a plurality of users to interacts with the display. The autostereoscopic display 110 may also be a multiple-view autostereoscopic display that provide views in addition to those provided by traditional two-view (right-left) stereo image display systems. Of course, the autostereoscopic display 110 may also be a single-user display that allows a single user to interact with the display. The autostereoscopic display 110 may also be a single-view autostereoscopic display that displays a single view stereo image.

In the illustrated embodiment of the apparatus 100, the motion tracking system 120 may include a first video camera 122 and a second video camera 124, which track and image the 3D motion of the user 127 within an interaction volume 128, and which generate a plurality of video frames of the 3D motion. The motion tracking system 120 may further include a processor 126 that analyzes, frame by frame, the plurality of video frames generated by the video cameras 122 and 124. The interaction volume 128 may be defined by the fields-of-view of the two cameras 122 and 124. In particular, the interaction volume 128 may be the region of space in which the fields of view of both cameras 122 and 124 intersect. The cameras 122 and 124 may be FireWire cameras, for example. Alternatively, it may also be possible to use USB-based cheaper web-cams to track the user input, because of the increase in the speed of USB 2.0.

The 3D motion of the user 127 may result from the user 127 holding a light source 129 or other optical marker, and moving the light source 129 within the interaction volume 128, as illustrated in FIG. 1. The light source 129 may be a tiny point flashlight, just by way of example, although many other types of light sources and/or optical markers may also be used. The user 127 may draw figures within the interaction volume 128, using the light source 129. Alternatively, the user 127 may move his hand or other part of his anatomy within the interaction volume 128.

The processor 126 may use a tracking algorithm to analyze the video frames generated by the video cameras 122 and 124. The processor 126 may extract, from each frame, position information of the moving light source 129 (or other optical marker or user hand motion). The processor 126 may analyze the live video frames frame-by-frame, using the tracking algorithm, to find the 3D spatial coordinates in each frame of a center of the light source 129. The 3D tracking data generated by the motion tracking system 120 may contain the position information extracted by the processor 126.

In one exemplary embodiment, brightness thresholding may be used, in order to find the location of the light source 129 in a frame. The threshold may be adjusted so that the light source 129 appears as a small point. Since the light source is very bright, the camera gain may be reduced yet a very good image of the light source 129 may still be obtained.

In this embodiment, the software in the processor 126 may find the location of the brightest pixels in the image, for every one of the plurality of frames generated by the video cameras 122 and 124. Because of the thresholding, nearly all pixels may be black, except for the pixels that represent an image of the light source, therefore the white pixels may be found with great accuracy. Next, the software may do simple averaging to find the center of mass of the whitest area, and this center of mass may be the location of the light source 129 in one of the two cameras. The software may repeat the same operation for the frame acquired by the other camera. Finding the 3D location of the light source 129 in pixel coordinates may involve taking two (such as z and y) coordinates from one of the two cameras and the remaining (x) coordinate from the other one of the two cameras, after applying rotation software to the camera axes. In a special case in which the cameras are positioned exactly perpendicular to each other, one coordinate (such as z) acquired from both cameras may be the same.

In the embodiment of the apparatus 100 that is illustrated in FIG. 1A, the imaging system 130 may be a virtual imaging system, although in other embodiments (for example the embodiment illustrated in FIG. 1B) a real imaging system may also be used. The virtual imaging system 130, shown in FIG. 1A, may include an image acquisition subsystem 132 that uses the 3D tracking data to create in virtual space a virtual scene representing the interaction of the user 127 with the autostereoscopic display, and that synthesizes a plurality N of views of the virtual scene. The virtual imaging system 130 may further include a graphics subsystem 134 that interlaces the plurality N of views of the virtual scene, to generate a final interlaced image to be displayed on the autostereoscopic display 110.

The image acquisition subsystem 132 may include a virtual object tracer 142, which receives the position information from the processor 126, i.e. receives the 3D spatial coordinates of the center of the light source 129, and redraws each point in virtual space. For example, the virtual object tracer 142 may accept drawing commands in the form of the 3D spatial coordinates (x,y,z) of the cursor 129, and may draw one or more 3D virtual objects in virtual space using these coordinates. In this way, the virtual object tracer 142 may create one or more virtual scenes that include these 3D virtual objects.

The image acquisition subsystem 132 may further include a multiple view synthesizer 144, which may use a plurality n of virtual cameras 146 to produce a plurality N of synthesized views of the virtual scene. In one embodiment of the imaging system 130, N may be about nine, although other embodiments of the imaging system 130 may use different values for N. A different one of the nine views may be produced, by shifting one of the virtual cameras 146, for example horizontally.

The graphics subsystem 134 may include an interlacer 152 that interlaces the plurality N of synthesized views of the virtual scene, at a sub-pixel level, to generate a final interlaced image, i.e. to generate digital image data representative of the interlaced image. The graphics subsystem 134 may further include a graphics card 154 that converts the digital data representing the interlaced image into appropriate input signals for the autostereoscopic display 110, i.e. into signals that allow the autostereoscopic display 110 to display the interlaced image.

The image acquisition subsystem 132 and the graphics subsystem 134 may include a 3D drawing and image manipulation program, based for example on OpenGL and Visual C++, although other types of software programs may also be used.

In an exemplary embodiment illustrated in FIG. 1A, ($X_o$, $Y_o$, $Z_o$) may represent the coordinates of the virtual 3D scene. ($X_{cn}$, $Y_{cn}$) may represent the coordinates of the virtual 3D scene as measured by the detector array of the n-th virtual camera, out of the plurality of virtual cameras 146. The apparatus 100 may use from about two (2) to about nine (9) virtual cameras, in order to create the sensation of a 3D display, although different embodiments of the apparatus 100 may use different numbers of virtual cameras. $(X_{sn}, Y_{sn})$ may represent the coordinates of view n at the surface of the autostereoscopic display 110. $(X_i, Y_i, Z_i)$ may represent the coordinates of the displayed points, as perceived by a human observer. These coordinates may depend on viewing distance, eye separation and other parameters. $(X_{in}, Y_{in}, Z_{in})$ may represent the coordinates within the effective interaction volume 128. A cursor or user's hand may have to be located within this volume, in order for both cameras 122 and 124 to track its position. $(X_{t1}, Y_{t1})$ and $(X_{t2}, Y_{t2})$ may represent the coordinates of the objects in the interaction volume, as measured by the detector array of cameras 122 and 124, respectively. These coordinates may be processed to create $(X_t, Y_t, Z_t)$, which may represent the 3D location of an object in the interaction volume as seen by both cameras 122 and 124.

The software in the apparatus 100 may be built in a modular structure, in order to facilitate the adding of new parts. For example, in one embodiment (not shown) a 3D audio system may be added to the apparatus 100. The 3D audio system may be configured to generate and process 3D auditory signals resulting from the interaction of the user with the autostereoscopic display. The 3D audio system may be, for example, 3D binaural or 5.1-channel surround sound system, although other types of 3D audio systems may also be used. Such a 3D audio system may enhance the stereoscopic experience.

The 3D audio system may, for example, create and process 3D auditory signals that attach to the motion of a virtual object. In other words, whenever the object moves and wherever the object goes, it may sound as if the object is making a noise, because of the 3D auditory signals created by the 3D audio system. The 3D auditory signals may inform users of various computing process events (carried out by either the motion tracking system 120 or the imaging system 130 or both). The 3D auditory signals may inform users about one or more functions of one or more software programs within the motion tracking system 120 and/or the imaging system 130. These function may include, but are not limited to, the rate of completion of the software program, and the amount of work done by the software program. The 3D auditory signals may inform users that they have moved out of the interaction volume.

Figure 1B:
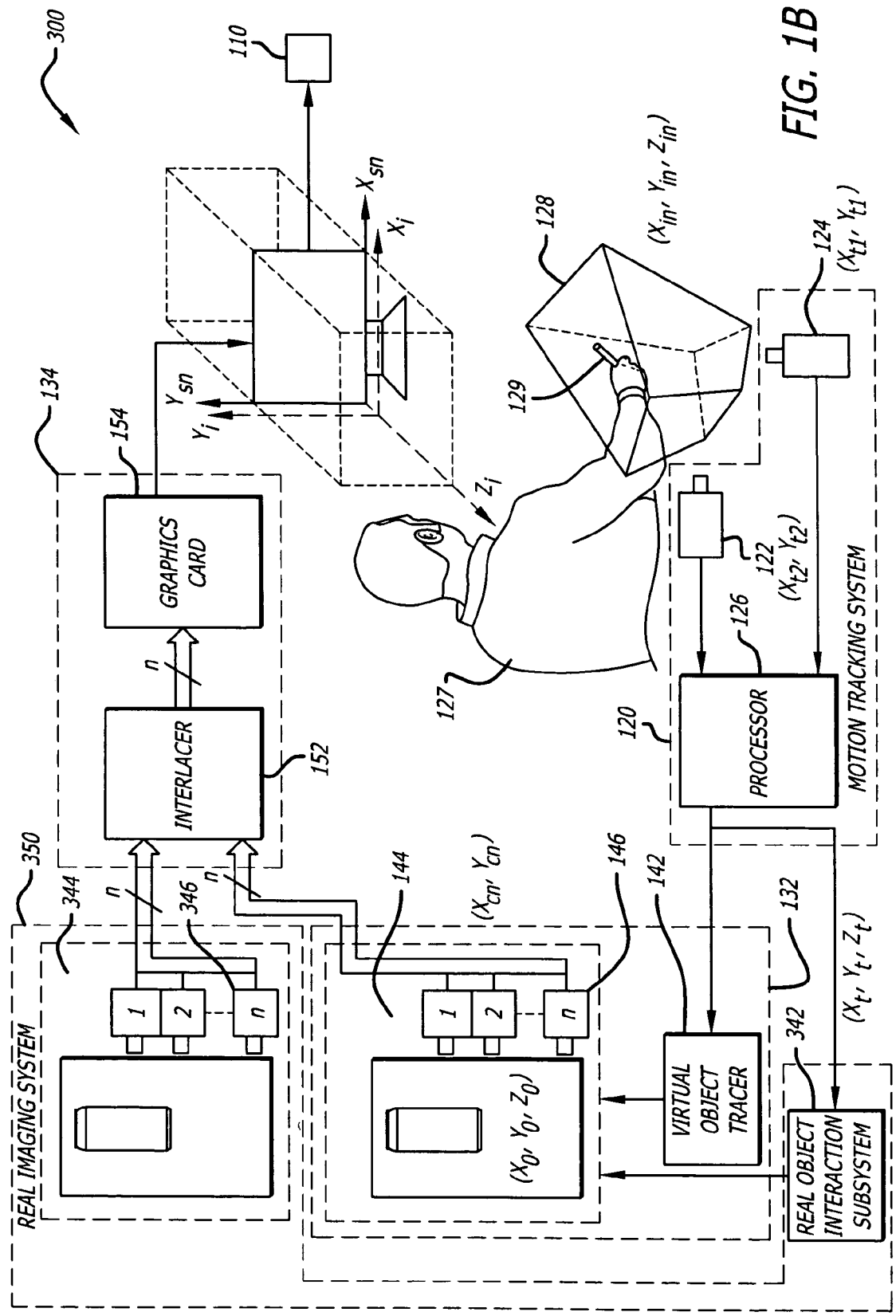
FIG. 1B illustrates a schematic block diagram of an apparatus that allows 3D interaction with autostereoscopic displays, and that includes a real imaging system.

An exemplary embodiment of an apparatus 300 for 3D interaction with an autostereoscopic display that includes a real imaging system is illustrated in FIG. 1B. The apparatus 300 includes a real imaging system 350, in addition to components such as an autostereoscopic display 310, a motion tracking system 120 (including video cameras 122 and 124, and a processor 126), a virtual imaging system 130 (including an image acquisition subsystem 132, a virtual object tracer 142, and a multiple view synthesizer 144 including a number n of virtual cameras 146), and a graphics subsystem 134 (including an interlacer 152 and a graphics card 154), all of which have been described in conjunction with FIG. 1A.

By adding multiple camera real-time video capture, the apparatus 300 may allow the user 127 to interact with 3D video of live scenes. The real imaging system 350 may, for example, include a real object interaction subsystem 342 which processes real interactions between the user 127 and real objects, and a real image acquisition system 344, which uses a plurality n of real cameras 346 to capture a plurality N of real views of the real interactions between the user 127 and real objects.

Figure 2:
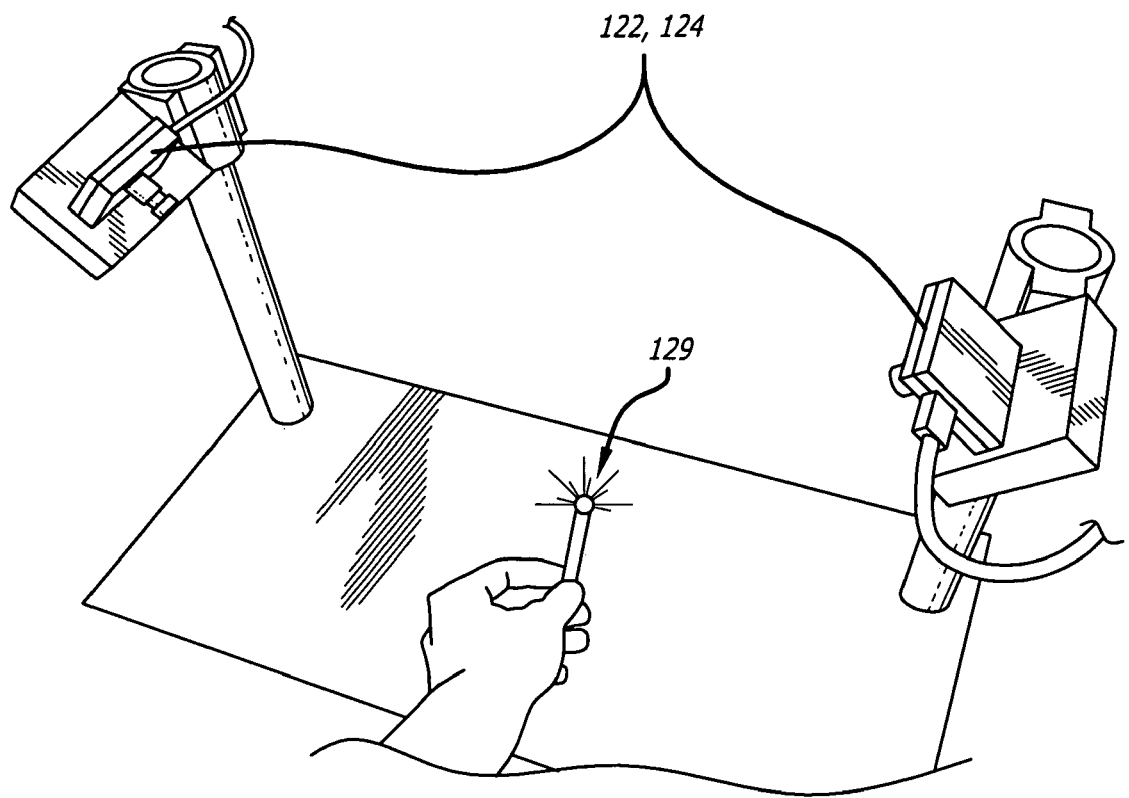
FIG. 2 illustrates two video cameras tracking a light source within an interaction volume.

FIG. 2 illustrates a perspective view of the pair of video cameras 122 and 124 that track the light source 129 that is held and moved by the user 127. If the cameras are positioned perpendicular to each other, gives the 3D coordinates of the light source in camera pixel coordinates may be obtained by a simple combination of two axes from one camera and the third axis from the other camera. In general, however, the cameras may not have to be positioned perpendicular to each other, and may be positioned at any desired locations.

In one embodiment, the cameras 122 and 124 may record video at a 640×480 resolution with 30 fps frame rate, thus tracking the light source with an accuracy of 640 pixels in two dimensions and an accuracy of 480 pixels in the third dimension. Cameras having different resolutions and different frame rates may be used in other embodiments.

Figure 3:
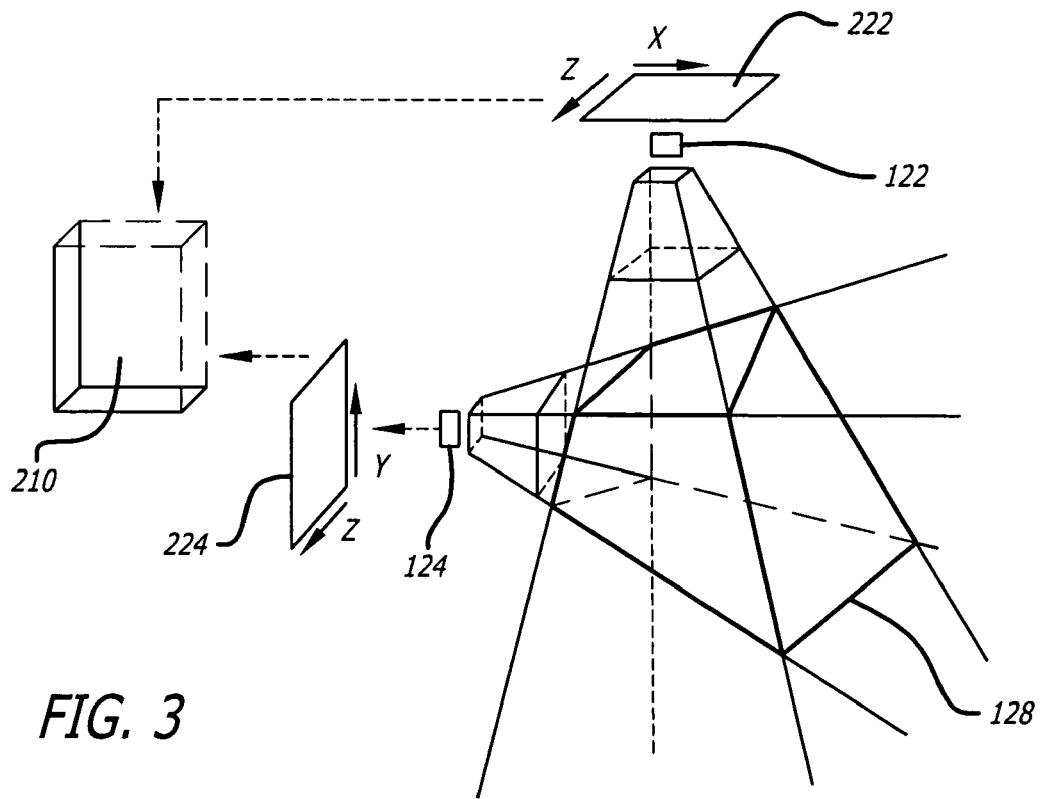
FIG. 3 illustrates a geometric relationship between the interaction volume and the autostereoscopic display space.

FIG. 3 illustrates a geometric relationship between the interaction volume 128 and the autostereoscopic display space. As seen from FIG. 3, the interaction volume 128 may be defined as the region in space where the fields of view of the two cameras 122 and 124 interact, since the light source 129 held by the user cannot go inside the monitor of the autostereoscopic display. For simplicity, cameras 122 and 124 are illustrated in FIG. 3 as having optical axes that are perpendicular to each other, although as explained earlier the optical axes of the cameras need not be perpendicular, and the cameras may be placed at any desired location. As a result of mutually perpendicular optical axes, the image plane 222 for the camera 122 is perpendicular to the image plane 224 for the camera 124, in the embodiment illustrated in FIG. 3. The image planes 222 and 224 may be translated into corresponding (mutually perpendicular) planes 322 and 324 in a virtual space 210.

As the cameras 122 and 124 track the movements of the light source 129 in the interaction volume 128, a pointer or cursor in the virtual space 210 may mimic the motion of the light source, to produce a 3D shape which may consist of points or lines. The processor 126 in the motion tracking system may convert the tracking information coming from the cameras 122 and 124 into horizontal, vertical and depth (parallax) coordinates for the display. This information may processed and supplied as the necessary plurality of views for the autostereoscopic display. In one embodiment of the apparatus 100, when the software operates in a moving mode, it may use the 3D coordinate information coming from the tracking mode to translate the positions of the virtual objects.

In the illustrated embodiment, the interaction volume (defined by the fields of view of the two cameras 122 and 124) may occupy a physical volume that is separate from the physical volume occupied by the autostereoscopic display. In other words, the interaction volume 128 may be substantially non-overlapping with the physical volume occupied by the autostereoscopic display. In other embodiments of the apparatus 100, the interaction volume 128 may overlap with, and/or be placed in register with, the physical volume occupied by the autostereoscopic display.

Because the interaction volume 128 is not in register with the physical volume occupied by the autostereoscopic display, the user 127's hand movements may not need to be tracked right in front of the autostereoscopic display where the images appear. Instead, the cameras 122 and 124 may be placed at any desired position. Further, when the interaction volume 128 is non-overlapping and out of register, the interaction volume 128 may have an increased size. By removing the restriction that the user can interact only with objects appearing in front of the display plane of the autostereoscopic display, the user 127 may be allowed to interact also with objects appearing behind the display plane, as just one example. In this specific case, the interaction volume may at least double in size.

In the illustrated implementation of an interaction that is not in register, the user may interact with virtual objects with the help of a cursor that represents the light source in virtual space. Using a cursor may avoid the need to accommodate vergence conflict of a human observer. To perceive a 3D sensation, the user's eyes may have to focus on the display plane of the autostereoscopic display. However, if the user 127 wants to perform in-register interaction, and to interact without the help of a cursor, he may have to focus on his hand and the display plane at the same time. Since the hand may not touch the display plane, the user may have to focus on two different planes, causing eyestrain. Implementing an interaction that is not in register, by using a cursor in virtual space, may avoid such a vergence conflict.

Figure 4:
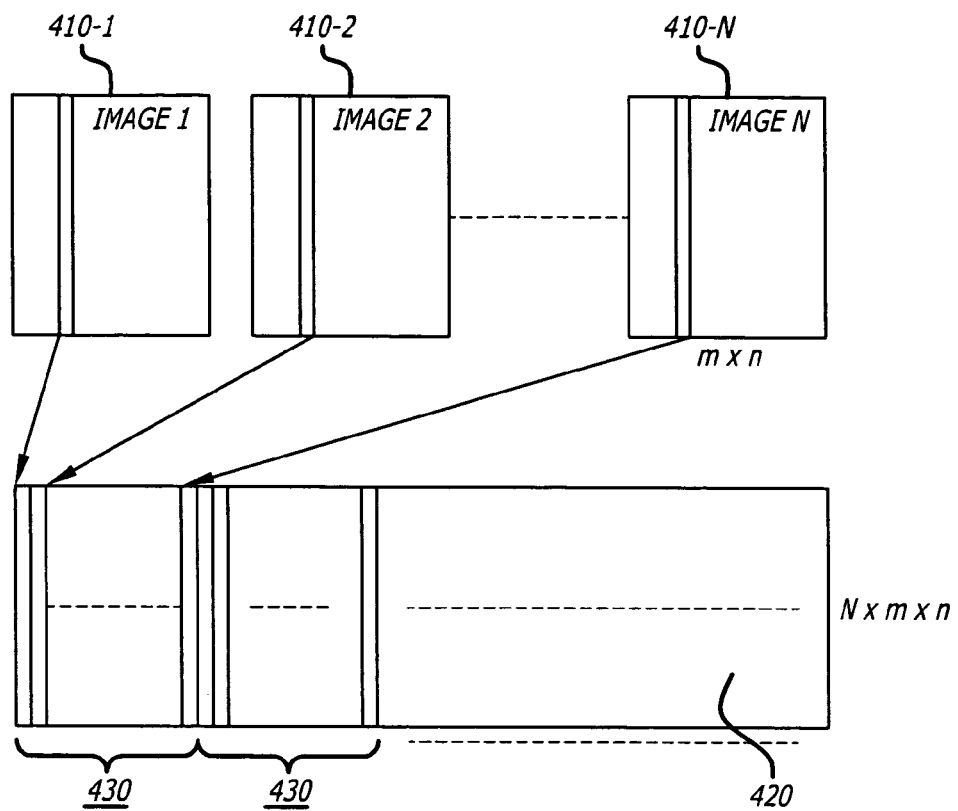
FIG. 4 illustrates the interlacing of N images to be displayed under a vertically oriented lenticular sheet.

FIG. 4 illustrates the interlacing of N images to be displayed under a vertically oriented lenticular sheet. Interlacing may be a process of multiplexing a plurality of images (for example the illustrated plurality N of images 410-1, 410-2, ..., 410-N) onto a display covered by a lenticular sheet 420. A lenticular sheet may contain a series of long thin lenses (e.g. cylindrical lenses) molded into a substrate. When the lenticular sheet is vertical, interlacing may be done by cutting each input image into thin vertical slices, and placing them side by side horizontally so that exactly one slice from each input image is under a lenticula 430.

Interlacing for vertical lenticular sheets, as shown in FIG. 4, may create an image generally referred to as a parallax panoramagram. The width $S_{pp}$ of a parallax panoramagram may be the sum of the width $S_{image}$ of all the images that contribute to it, as indicated in the following formula:

$$S_{pp} = \Sigma S_{image} \qquad \text{Eq. (1)}$$

Assuming that all the input images have the same size, then the width $S_{pp}$ may simply be given by:

$$S_{pp} = N S_{image}, \qquad \text{Eq. (2)}$$

where N represents the total number of images that are interlaced.

As seen from FIG. 4, each group of N slices may be made to fit exactly under a lenticula, in a interlacing process. The total number of pixels of the parallax panoramagram may be N times the number of pixels of one image, i.e. N×m×n.

For LCD (liquid crystal display) panels, lenticular sheet interlacing may be done in a different way. Vertical lenticular LCDs may suffer from a Moire-like vertical dark band effect. Slanting the lenticular sheet with respect to the vertical at a small angle may remove the dark bands in the displayed image, and may make the transition between views appear to be more continuous. However, both the horizontal and vertical effective resolution of each view may be reduced, in an embodiment of the apparatus 100 in which N=9, because the nine images are multiplexed onto a fixed resolution of the LCD display.

Figure 5:
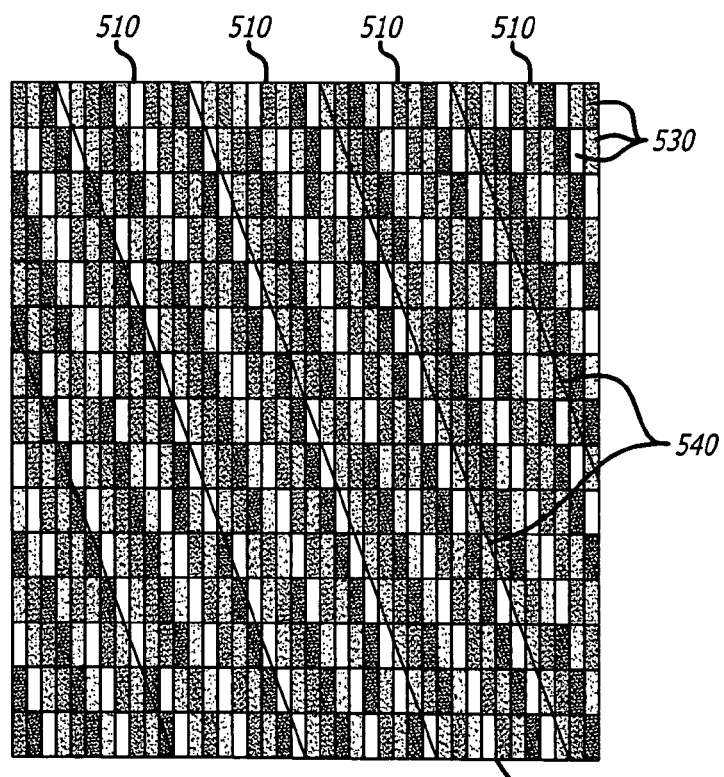
FIG. 5 illustrates a sub-pixel multiplexing arrangement under several lenticulae of a slanted lenticular sheet.

FIG. 5 illustrates a sub-pixel multiplexing arrangement under several lenticulae 510 of a slanted lenticular sheet 520. In an exemplary embodiment of the apparatus 100, the display may have a basic resolution of 1600×1200, with each pixel composed of red (R), green (G) and blue (B) sub-pixels. The small rectangles 530 shown in FIG. 5 represent the red (R), green (G) and blue (BO sub-pixel of the display. The nine different gray levels shown in FIG. 5 represent the interlace patterns for the nine image views, as they are mapped onto the display. Bold black lines 540 in FIG. 5 represent the edges of the lenticular of the slated lenticular sheet 520.

The pitch of a slanted lenticular sheet may be less than that used for vertically oriented sheets. Because the sub-pixels of an LCD panel may typically be rectangular, it may not be easy to have an exact register of sub-pixels and slanted lenticulae. In one embodiment of the apparatus 100, an interlacing process provided by StereoGraphics and DDD may be used, which use an approach similar to an approach developed by van Berkel. In other embodiments, different algorithms may be used for the interlacing process.

In an exemplary embodiment of the apparatus 100, the apparatus 100 may track the motion of a flashlight cursor running at 15 fps and draws an image with 640×480 resolution in real-time. In this embodiment, the functions of the apparatus 100 may include: move, draw and save. The move function may translate an object's location in stereo space coordinate $(X_i, Y_i, Z_i)$.

Figure 6:
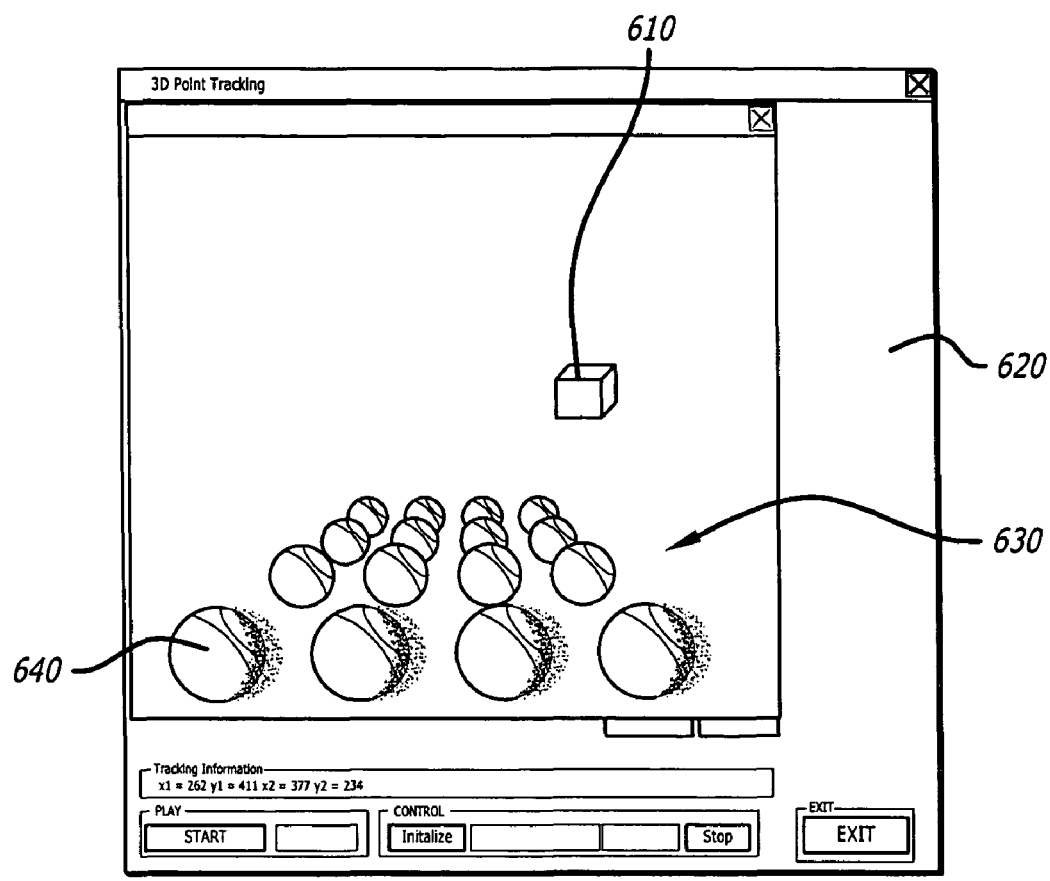
FIG. 6 illustrates a move function, which may translate an object's location in stereo space coordinates.

FIG. 6 illustrates a move function, and in particular shows a picture of a cube 610 moving in an autostereoscopic display space. In the illustrated embodiment, a screen shot of a monoscopic display is shown, in which a 4×4 array 630 of spheres 640 serve as depth level indicators in the stereo window. In FIG. 6, the single cube 610 moves in stereo space according to the user's commands. The fuzziness of the displayed spheres 640 may come from the interlacing algorithm. When viewed with a lenticular display, the row with the largest spheres may appear in front of the display surface, the second row of spheres may appear at the display surface, and the rows with the smallest spheres may appear behind the display surface.

Figure 7A:
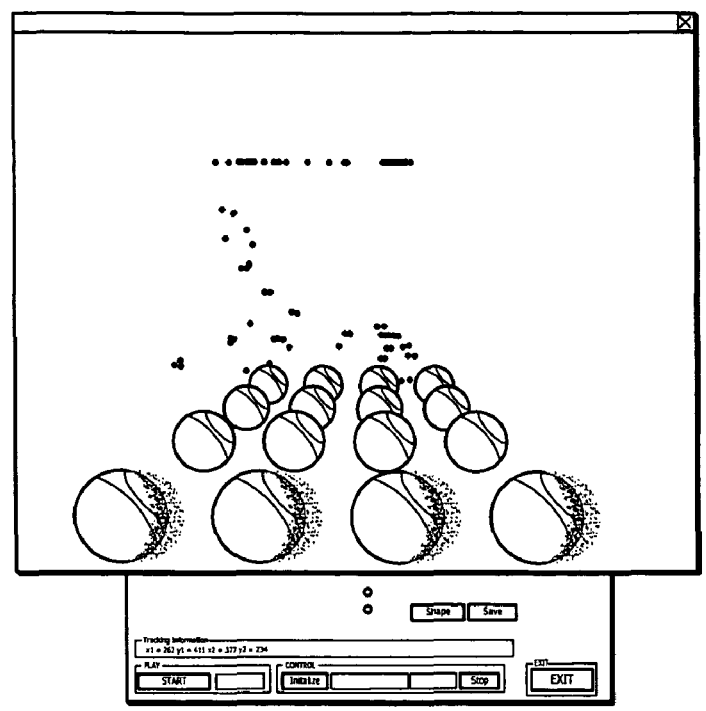
FIG. 7 illustrates a draw function, which may create a solid object.
Figure 7B:
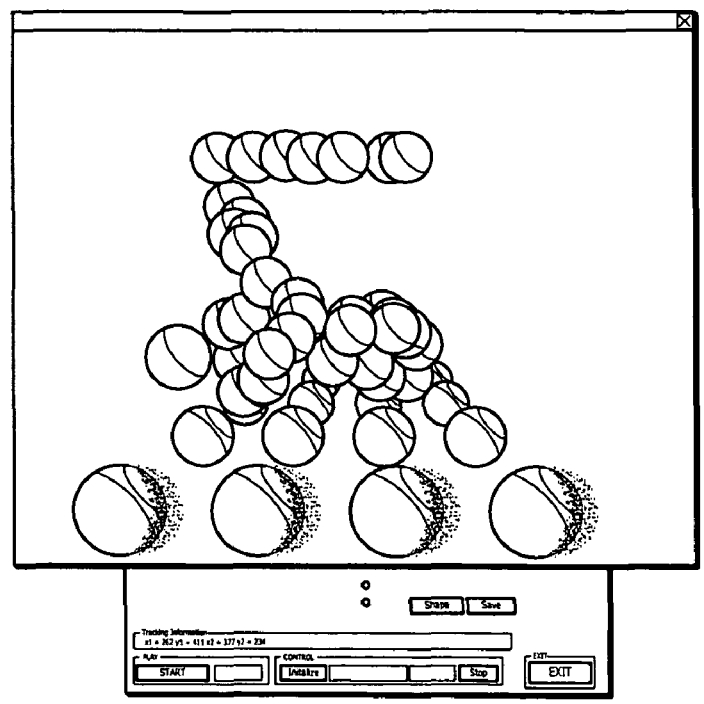

FIGS. 7A and 7B illustrate a draw function, which may create a solid object. In the embodiment illustrated in FIGS. 7A and 7B, the draw function may be implemented as a wire-frame drawing tool, in order to save processing time. The user may first create a wire-frame object, made of dots. FIG. 7A shows the wire-frame version of the object drawn by user. When the user finishes drawing the wire-frame object, the user may stop the tracking and may make the drawing a solid object by using a basic shape such as a sphere, as shown in FIG. 7B.

In an exemplary embodiment, the figures drawn by the virtual object tracer 142 may be saved as text files. Instead of saving the whole image, just the 3D coordinates the program uses for creating and transforming a virtual object may be saved. The file size for an image such as the ones shown in FIGS. 7A and 7B may be just a few KBs.

In another exemplary embodiment, a rotation tool may be implemented that can rotate a virtual object by clicking buttons on the desktop using a mouse. The rotation and other manipulation functions may be moved to stereo space.

In sum, an apparatus and method have been described that allow for interactive input and manipulation of 3D data using a motion tracking system in combination with an autostereoscopic display. Using a two-camera configuration, the computation and processing time needed for tracking light sources used as a 3D cursor may be considerably reduced. Also, there may be no need to track the head to stabilize the image. In one of the embodiments of the apparatus described above, the autostereoscopic display may already have a built-in look-around capability, as the autostereoscopic display has nine images inside a viewing zone. The interaction algorithm describe above may allow a user to interact with images both appearing inside the display and in front of the display.

A multi-user autostereoscopic display may be used, thus allowing more than one user to see the interaction at the same time, and allowing more than one person to interact with the display, by tracking two or more light sources. By connecting two of the above-described apparatuses via Internet, it may be possible to have a 3D interaction. For example, one user's drawing may appear and float in space, in front of another user at a remote location. Multiple users may be able to interact with our AS desktop system at the same time.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of what is disclosed above. Thus, the apparatus and method described above are not intended to be limited to the embodiments shown herein, but is to be accorded the full scope consistent with the claims, wherein reference to an element in the singular is not intended to mean "one and only one" unless specifically so stated, but rather "one or more."

All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus comprising:
   an autostereoscopic display;
   a motion tracking system configured to track a 3D motion of a user within an interaction volume as the user interacts with the autostereoscopic display, and to generate 3D tracking data containing position information about the 3D motion; and
   an imaging system configured to process the 3D tracking data to generate therefrom an image for display on the autostereoscopic display,
   wherein the motion tracking system comprises a first video camera and a second video camera, the first and second video cameras configured to generate a plurality of video frames of the 3D motion; and wherein the motion tracking system further comprises a processor configured to process the plurality of video frames to extract therefrom the position information about the 3D motion,
   wherein the interaction volume is defined by a field-of-view of the first video camera and by a field-of-view of the second video camera,
   wherein the 3D motion comprises: at least one of: a 3D motion of an optical marker that is held and moved by the user; and a 3D motion of a portion of the user's anatomy that is moved by the user,
   wherein the position information comprises 3D spatial coordinates of a center of one of the optical marker and the portion of the user's anatomy,
   wherein the processor is configured to use a tracking algorithm to analyze the plurality of video frames so as to find the 3D spatial coordinates of the center in each of the plurality of frames,
   wherein the imaging system comprises a virtual imaging system,
   wherein the virtual imaging system comprises:
      an image acquisition subsystem configured to use the 3D tracking data to create in virtual space a virtual scene representing the interaction of the user with the autostereoscopic display; and
      a graphics subsystem configured to interlace a plurality N of views of the virtual scene to generate an interlaced image to be displayed on the autostereoscopic display.

2. The apparatus of claim 1, wherein the image acquisition subsystem comprises a virtual object tracer configured to generate the virtual scene by tracing one or more 3D virtual objects using the 3D spatial coordinates received from the motion tracking system, and further comprises a multiple view synthesizer configured to synthesize a plurality N of views of the virtual scene, the multiple view synthesizer including a plurality of virtual cameras.

3. The apparatus of claim 1, wherein the graphics subsystem comprises an interlacer configured to interlace the plurality N of views and to generate digital data representative of the interlaced image, and a graphics card configured to convert the digital data into one or more input signals adapted for display of the interlaced image on the autostereoscopic display.

4. The apparatus of claim 2, wherein the multiple view synthesizer is further configured to generate each one of the plurality N of views by shifting at least one of the plurality of virtual cameras so as to change a viewing angle at which the virtual scene is viewed.

5. The apparatus of claim 1, wherein N is about 9.

6. The apparatus of claim 1, wherein the graphics subsystem is further configured to interlace the plurality N of views by interlacing each one of the views onto a vertical lenticular sheet so as to create a parallax panoramagram.

7. The apparatus of claim 1, wherein the graphics subsystem is further configured to interlace the plurality N of views by interlacing each one of the views onto a slanted lenticular sheet.

8. The apparatus of claim 1, further comprising a three dimensional (3D) audio system configured to generate and process 3D auditory signals relating to the interaction of the user with the autostereoscopic display and which seem to be coming from a virtual object as it moves under the control of the user interaction.

9. The apparatus of claim 8, wherein the 3D auditory signals are generated when a virtual object, created as a result of the interaction of the user with the autostereoscopic display, undergoes motion.

10. The apparatus of claim 8, wherein at least one of the motion tracking system and the imaging system is further configured to carry out one or more computer processing events, and wherein 3D audio system is further configured to generate and process 3D auditory signals that inform the user of the one or more computer processing events.

11. The apparatus of claim 8, wherein at least one of the motion tracking system and the imaging system includes a software program, and wherein the 3D audio system is further configured to generate and process 3D auditory signals that inform the user about one or more functions of the software program.

12. The apparatus of claim 11, wherein the functions of the software program comprises at least one of: a rate of completion of the software program; and an amount of work done by the software program.

13. The apparatus of claim 8, wherein the 3D audio system is further configured to generate and process 3D auditory signals that inform the user if the user moves out of the interaction volume.

* * * * *